United States Patent [19]

Argoudelis et al.

[11] B 3,993,748
[45] Nov. 23, 1976

[54] ANTIBIOTIC U-47,929 AND ITS PREPARATION

[75] Inventors: Alexander D. Argoudelis; Fritz Reusser; Howard A. Whaley, all of Portage, Mich.

[73] Assignee: The Upjohn Company, Kalamazoo, Mich.

[22] Filed: Jan. 20, 1975

[21] Appl. No.: 542,226

[44] Published under the second Trial Voluntary Protest Program on February 24, 1976 as document No. B 542,226.

[52] U.S. Cl. ............................................. 424/118
[51] Int. Cl.² .................................... A61K 35/70
[58] Field of Search .................................. 424/118

[56] References Cited

UNITED STATES PATENTS

| | | | |
|---|---|---|---|
| 3,043,830 | 7/1962 | Haskell et al. | 424/118 |
| 3,454,696 | 7/1969 | Weinstein et al. | 424/118 |
| 3,499,078 | 3/1970 | Luedemann et al. | 424/118 |

*Primary Examiner*—Sam Rosen
*Attorney, Agent, or Firm*—Roman Saliwanchik

[57] ABSTRACT

New antibiotic U-47,929 produced by the controlled fermentation of the new microorganism *Streptomyces ficellus* Dietz, sp. n., NRRL 8067. This antibiotic and its acid-addition salts are active against Gram-positive bacteria. Accordingly, they can be used in various environments to eradicate or control such bacteria.

8 Claims, 2 Drawing Figures

ANTIBIOTIC U-47,929 AND ITS PREPARATION

BRIEF SUMMARY OF THE INVENTION

The novel antibiotic of the invention, U-47,929 is obtained by culturing *Streptomyces ficellus* Dietz, sp. n., NRRL 8067, in an aqueous nutrient medium under aerobic conditions. Antibiotic U-47,929 and its acid-addition salts have the property of adversely affecting the growth of Gram-positive bacteria, for example, *Staphylococcus aureus*, *Sarcina lutea*, *Streptococcus hemolyticus*, *Diplococcus pneumoniae*. Antibiotic U-47,929 is particularly active against *S. aureus* in vitro and in vivo in mice. Accordingly, U-47,929 and its acid-addition salts can be used alone or in combination with other antibiotic agents to prevent the growth of or reduce the number of bacteria, as disclosed above, in various environments.

DETAILED DESCRIPTION OF THE INVENTION

Chemical and Physical Properties of U-47,929

Molecular Formula: $C_{13}H_{24}N_6O_3$ (Determined by high resolution mass spectrometry)

Elemental Analysis: Calcd.: C, 50.00; H, 7.69; N, 26.92; O, 15.38. Found: C, 46.27; H, 7.59; N, 25.05.

Molecular Weight: 312.1929 (Determined by mass spectrometry)

Melting Point: Material decomposes over broad range of temperatures.

Specific Rotation: $[\alpha]_D^{25} = +39°$ (c, 1, water)

Solubilities: Antibiotic U-47,929 is soluble in water and lower alcohols, for example, methanol and ethanol; it is relatively insoluble in ketones, halogenated or saturated hydrocarbon solvents, ethyl acetate, or other ester-type solvents.

Ultraviolet Absorption Spectra: No maximum observed between 220–400 m$\mu$.

Titration Date: Antibiotic U-47,929 behaves like a very strong base. Titration with aqueous KOH did not show a titratable group. Titration with aqueous HCl shows an equivalent weight of 288. Titration of a solution of antibiotic U-47,929 in acetic acid using perchloric acid shows an equivalent weight of 292.

Figure 1:
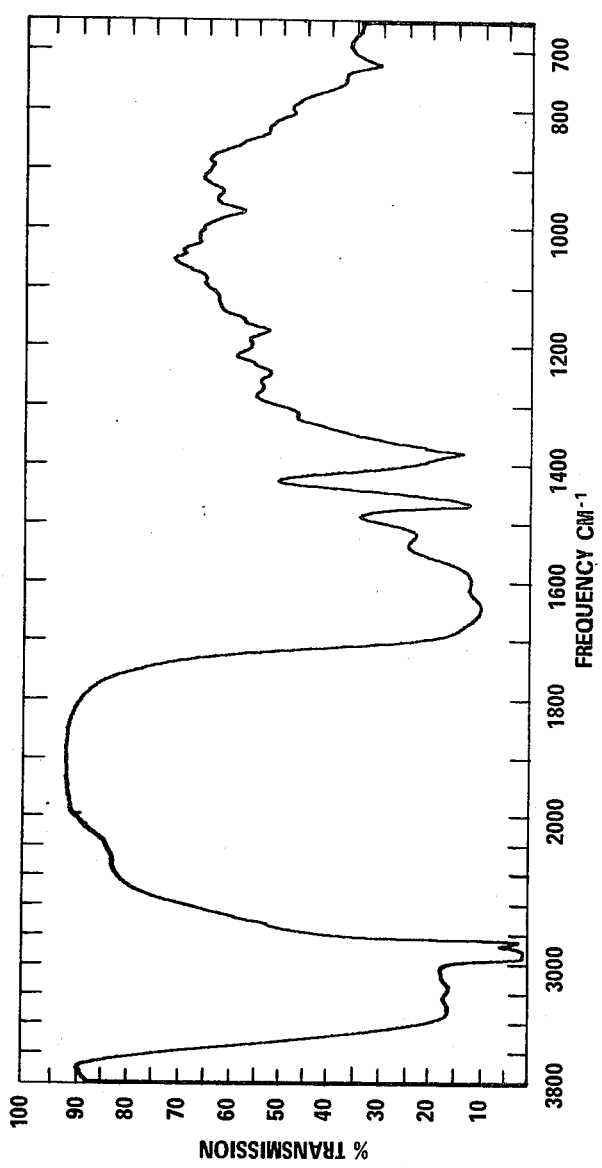

Infrared Absorption Spectra: U-47,929 has a characteristic infrared absorption spectrum in a mineral oil mull as shown in FIG. 1 of the drawings. Peaks are observed at the following wave lengths expressed in reciprocal centimeters:

| Band Frequency (Wave Numbers) | Intensity |
|---|---|
| 3330 | s |
| 3170 | s |
| 3070 | s, sh (sh=shoulder) |
| 2960 | s, oil |
| 2920 | s, oil |
| 2850 | s, oil |
| 1640 | s |
| 1592 | s |
| 1518 | s |
| 1467 | s, oil |
| 1377 | s, oil |
| 1312 | m |
| 1265 | m |
| 1242 | m |
| 1195 | w |
| 1170 | m |
| 1150 | w, sh |
| 1104 | w, sh |
| 1083 | w, sh |
| 1040 | w |
| 1020 | w, sh |
| 968 | w |
| 932 | w |
| 890 | w |
| 832 | m, sh |
| 802 | m |
| 745 | m, sh |
| 720 | m, oil |

U-47,929 also has a characteristic infrared absorption spectrum when pressed in a KBr disc. Peaks are observed at the following wave lengths expressed in reciprocal centimeters:

| Band Frequency (Wave Numbers) | Intensity |
|---|---|
| 3370 | s |
| 3180 | s |
| 2960 | s |
| 2870 | m |
| 2210 | w |
| 1645 | s |
| 1600 | s |
| 1518 | s |
| 1469 | m |
| 1390 | s |
| 1312 | m, sh |
| 1265 | m |
| 1242 | m |
| 1195 | m |
| 1171 | m |
| 1150 | m, sh |
| 1102 | w, sh |
| 1083 | w, sh |
| 1040 | w |
| 1020 | w, sh |
| 968 | m |
| 932 | w |
| 832 | m, sh |
| 800 | m |
| 748 | m |
| 712 | m |
| 655 | m |

Infrared band intensities, throughout this disclosure, are indicated as *s*, *m*, and *w* respectively, and are approximated in terms of the backgrounds in the vicinity of the bands. An *s* band is of the same order of intensity as the strongest in the spectrum; *m* bands are between one-third and two-thirds as intense as the strongest band; and, *w* bands are less than one-third as intense as the strongest band. These estimates are made on the basis of a percent transmission scale.

Nuclear Magnetic Resonance (NMR)

Figure 2:
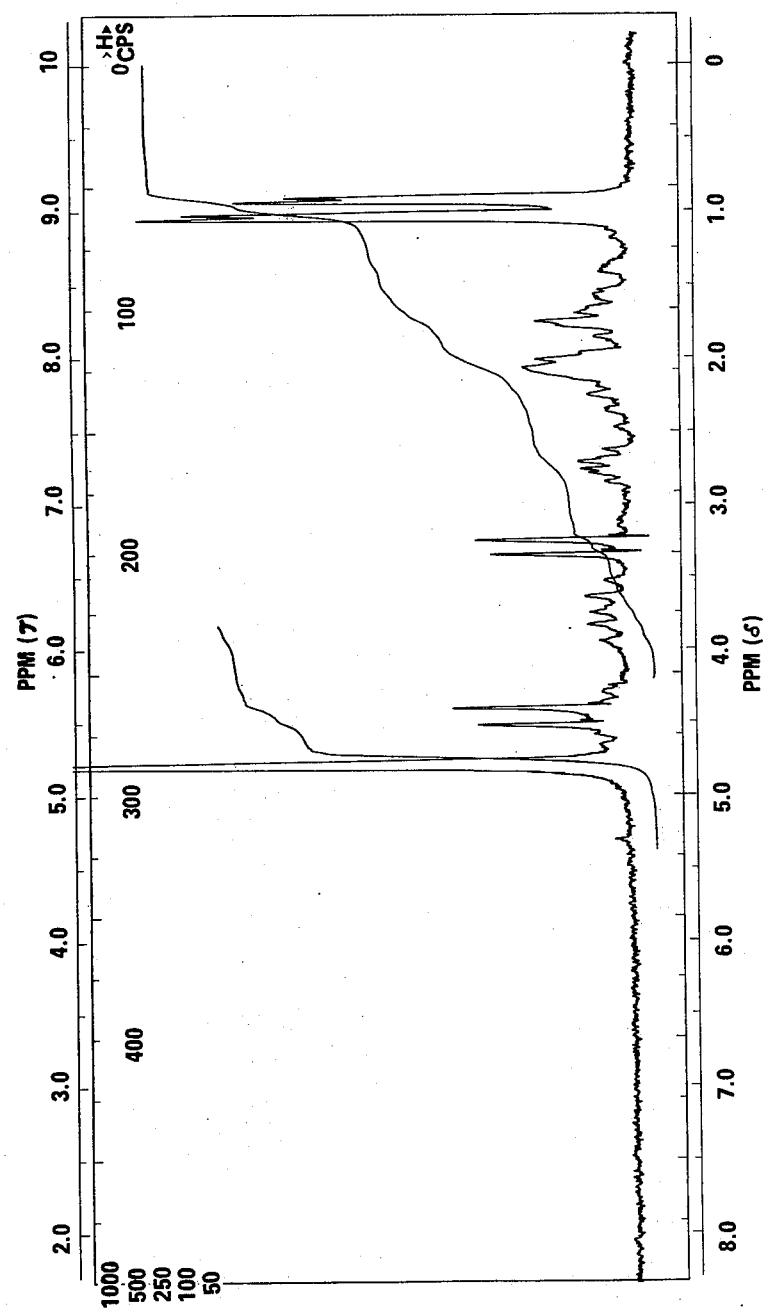

The NMR spectrum of antibiotic U-47,929 at 60 megacycles is shown in FIG. 2 of the drawings. The NMR spectrum was observed on a Varian A-60 Spectrometer on a solution (ca. 0.5 ml., ca. 15% concentration) of the sample of U-47,929 in deuterium oxide (D$_2$O). The spectrum was calibrated against internal tetramethylsilane and the precision of the $\Delta\gamma$ was $\geq \pm 1$ c.p.s. Frequencies were recorded in c.p.s. downfield from tetramethylsilane.

| Antibacterial Activity of U-47,929 | | |
|---|---|---|
| Organism | No. of Strains | Inhibition ($\mu$g/ml) |
| *Staphylococcus aureus* | UC 76 | 62.5 |
| *Staphylococcus aureus* | UC 570 | 125 |
| *Staphylococcus aureus* | UC 746 | 62.5 |

| | Antibacterial Activity of U-47,929 | |
|---|---|---|
| Organism | No. of Strains | Inhibition (µg/ml) |
| *Diplococcus pneumoniae* | UC 41 | 500 |

NOTE:
UC refers to the Upjohn Company Culture Collection.

The above antibacterial spectrum was obtained by a microplate broth dilution assay using the medium BBL Streptomycin Assay Broth and Agar (pH 7.9). The diluent was 0.05 M $PO_4$ buffer, pH 8.0.

Mice infected with *Staphylococcus aureus* UC96 were protected subcutaneously with a $CD_{50}$ of 6.2 (4.3 - 8.8) mg/kg of antibiotic U-47,929. Also mice infected with *Staphylococcus aureus* UC3090 (resistant to streptomycin) or *Staphylococcus aureus* UC571 (resistant to erythromycin and lincosaminides) were protected subcutaneously with $CD_{50}$'s of 10 (7.4 - 14) and 11 (7.3 - 16) mg/kg, respectively.

The UC cultures referred to above can be obtained from The Upjohn Company of Kalamazoo, Mich., upon request.

The Microorganism

The microorganism used for the production of U-47,929 is *Streptomyces ficellus* Dietz, sp. n., NRRL 8067. A subculture of this microorganism can be obtained from the permanent collection of the Northern Regional Research Laboratory, U.S. Department of Agriculture, Peoria, Ill., U.S.A.

The microorganism of this invention was studied and characterized by Alma Dietz of the Upjohn Research Laboratories.

This soil isolate is a streptomycete which may be placed in the "Lavendulae-Roseus Series" of Gauze [Gauze, G. F., T. P. Preobrazhenskaya, E. S. Kudrina, N. O. Blinov, I. D. Ryabova, and M. A. Iveshnikova. 1957. Problems in the classification of antagonistic actinomycetes. State Publishing House for Medical Literature, Moscow. English edition translated by Fritz Danga; David Gottlieb (ed.). The American Institute of Biological Sciences, Washington, D.C.], the "Streptomycetin mit cinnamomeus-Luftmycel" of Hutter [Hutter, R. 1967. Systematik der Streptomyceten. S. Karger, Basel. 382p.], or the "Red Series (17.44C)" of Pridham and Tresner in Bergey's Manual, 8th Edition [Buchanan, R. E., and N. E. Gibbons. 1974. Bergey's Manual of Determinative Bacteriology. Eighth Edition. The Williams & Wilkins Co., Baltimore]. The new culture is readily differentiated from species in the references cited and from cultures in the Upjohn culture collection. In Table 4 the culture is differentiated from *Streptomyces virginiae* [Grundy, W. E., A. L. Whitman, E. J. Rdzok, M. E. Hanes, and J. C. Sylvester. 1952. Actithiazic Acid. I Microbiological Studies. Antibiotics & Chem. 2:399-408], the culture in the groups cited to which it appeared most similar.

On the basis of the differences cited in Table 4, infra, and the lack of correlation of characteristics with cultures in the literature references cited, the new isolate is considered a new streptomycete species. It is designated *Streptomyces ficellus* Dietz sp. n. The name is derived from "ficelle" — the french name for thread. The spores of the culture appear threaded. It is understood that this culture is the type species and will be considered the type variety should cultures with similar properties be isolated.

Color characteristics: Aerial growth white to pale cream or pale peach to pale pink to pale gray. Melanin positive. Appearance on Ektachrome is given in Table 1. Reference color characteristics are given in Table 2. The culture may be placed in the Red (R) or Gray (GY) color groups of Tresner and Backus [Tresner, H. D., and E. J. Backus. 1963. System of color wheels for streptomycete taxonomy. Appl. Microbiol. 11:335-338].

Microscopic characteristics: Spore chains long, straight (RF) to open spiral (RA) to spiral (S) in the sense of Pridham et al. [Pridham, T. G., C. W. Hesseltine, and R. G. Benedict. 1958. A guide for the classification of streptomycetes according to selected groups. Placement of strains in morphological sections. Appl. Microbiol. 6:52–79]. Spores, examined with the transmission electron microscope, appear long (rectangular with three sided ends) and have a smooth silhouette by direct examination; by examination of carbon replica preparations the spore surface had a basket weave effect. Electron microscope procedures were those cited by Dietz and Mathews [Dietz, A., and J. Mathews. 1962. Taxonomy by carbon replication. I. An examination of *Streptomyces hygroscopicus*. Appl. Microbiol. 10:258-263] [Dietz, A., and J. Mathews. 1970. Classification of Streptomyces spore surfaces into five groups. Appl. Microbiol. 21:527-533].

Cultural and biochemical characteristics: Cultural and biochemical characteristics are cited in Table 3.

Carbon utilization: In the synthetic medium of Pridham and Gottlieb [Pridham, T. G., and D. Gottlieb. 1948. The utilization of carbon compounds by some Actinomycetales as an aid for species determination. J. Bacteriol. 56:107–114] *S. ficellus* had poor growth on the control (basal medium without added carbon compound), L-arabinose, rhamnose, D-fructose, sucrose, lactose, raffinose, inulin, dulcitol, D-mannitol, D-sorbitol, salicin, and Na tartrate; moderate growth on D-glucose, glycerol, Na acetate, Na citrate, and Na succinate; good growth on D-xylose, D-galactose, D-mannose, maltose, cellobiose, dextrin, soluble starch, and inositol. The cultures did not grow on phenol, cresol, Na formate, Na oxalate, or Na salicylate. In the synthetic medium of Shirling and Gottlieb [Shirling, E. B. and D. Gottlieb. 1966. Methods for characterization of Streptomyces species. Int. J. Syst. Bacteriol. 16:313–340] *S. ficellus* grew on the vegetative control (basal medium) and on the positive control (basal medium plus D-glucose). Growth on D-xylose and inositol was better than on the positive control. Growth on L-arabinose was the same as, and on sucrose and D-fructose poorer than on the positive control. There was no growth on D-mannitol, rhamnose, raffinose, or cellulose.

Temperature: *S. ficellus* had good vegetative and aerial growth at 18°–37°C. on Czapak's sucrose, maltose-tryptone, and Hickey-Tresner agars; at 18°–32°C. on Bennett's agar. The culture had good vegetative growth on these media at 45°C. in 24–48 hours. The culture did not grow at 4°C. but showed vegetative growth in 24 hours when reincubated at 24°C. At 55°C. none to trace vegetative growth was noted at 24–48 hours.

Table 1

| Appearance of *Streptomyces ficellus* on Ektachrome* | | |
|---|---|---|
| Agar Medium | Surface | Reverse |
| Bennett's | Pale pink | Yellow |
| Czapek's sucrose | Very pale pink | Colorless |
| Maltose-tryptone | Pink | Tan |
| Peptone-iron | — | Brown |
| 0.1% tyrosine | Pink | Red-Tan |
| Casein starch | Pink | Yellow-Tan |

*Dietz, A. 1954. Ektachrome transparencies as aids in actinomycete classification. Ann. N.Y. Acad. Sci. 60:152-154

Table 2

Reference Color Characteristics of *Streptomyces ficellus*

| Agar Medium | Determination | Color Harmony Manual 3rd ed., 1948* | NBS Circular 553, 1955** |
|---|---|---|---|
| Bennett's | S | 3cb(g) sand | — |
| | R | 2le(m) mustard, old gold | 88gm dark yellow |
| | | | 94g light olive brown |
| | | 2ic(m) honey gold, light gold | 87gm moderate yellow |
| | P | 2ec(m) biscuit, ecru, oatmeal, sand | 90gm grayish yellow |
| Czapek's | S | 3dc(gm) natural | — |
| sucrose | R | 3dc(gm) natural | — |
| | P | — | — |
| Maltose- | S | 3ca(gm) pearl pink, shell | 73gm pale orange yellow |
| tryptone | R | 3pe(g) amber, topaz | 72m moderate yellowish brown |
| | | | 74gm strong yellowish brown |
| | P | 2ec(g) biscuit, ecru, oatmeal, sand | 90gm grayish yellow |
| Hickey- | S | 3ca(g) pearl pink, shell | 73gm pale orange yellow |
| Tresner | | 3ec(g) bisque, light beige | 79gm light grayish yellowish brown |
| | | | 90g grayish yellow |
| | R | 3ic(g) light amber | 71m moderate orange yellow |
| | | | 72g dark orange yellow |
| | P | 3dc(m) natural | — |
| Yeast extract- | S | 5dc(g) pusseywillow gray | 10gm pinkish gray |
| malt extract | R | 3lc(g) amber, butterscotch | 71m moderate orange yellow |
| (ISP-2) | P | 2le(m) mustard, old gold | 88gm dark yellow |
| | | | 94g light olive brown |
| Oatmeal | S | 4ec(m) bisque, light rose beige | 32m grayish yellowish pink |
| (ISP-3) | | | 33gm brownish pink |
| | R | 2gc(g) bamboo, chamois | 90gm grayish yellow |
| | P | — | — |
| Inorganic- | S | 5cb(g) — | — |
| salts-starch | R | 3ec(g) bisque, light beige | 79gm light grayish yellowish brown |
| (ISP-4) | | 5gc(g) peach tan | 29m moderate yellowish pink |
| | | | 39g grayish reddish orange |
| | P | — | — |
| Glycerol- | S | 3dc(g) natural | — |
| asparagine | R | 3dc(g) natural | — |
| (ISP-5) | P | — | — |

S = Surface
R = Reverse
P = Pigment
(g) = glossy, (m) = matte, (gm) = glossy or matte surface of chip
*Jacobson, E., W. C. Granville, and C. E. Foss. 1948. Color harmony manual, 3rd ed. Container Corporation of America, Chicago
**Kelly, K. L., and D. B. Judd. 1955. The ISCC-NBS method of designating colors and a dictionary of color names. U.S. Dept. of Comm. Circ. 553, Washington, D.C.

Table 3

Cultural and Biochemical Characteristics of *Streptomyces ficellus*

| Medium | Surface | Reverse | Other Characteristics |
|---|---|---|---|
| Agar | | | |
| Peptone-iron | Pale gray-pink aerial | Pale tan-brown | Pale tan brown pigment |
| | | | Melanin positive |
| Calcium malate | Trace pale pink | Cream-gray | No pigment |
| | | | Malate solubilized |
| Glucose asparagine | Pale gray-pink | Pale yellow | No pigment |
| Skim milk | Trace white | Tan | Tan pigment |
| | | | Casein not to slightly solubilized |
| Tyrosine | White | Yellow-tan | Tan pigment |
| | | | Tyrosine solubilized |
| Xanthine | Pale pink | Yellow | Pale yellow pigment |
| | | | Xanthine solubilized under growth |
| Nutrient starch | Pale pink-peach | Yellow | Yellow pigment |
| | | | Starch hydrolyzed |
| Yeast extract- malt extract | Heavy pale salmon-pink | Yellow-tan | Yellow-tan |
| Peptone-yeast extract-iron (ISP-6) | Pale gray | Brown | Light brown pigment |
| | | | Melanin ± |
| Tyrosine (ISP-7) | Cream-gray | Yellow-tan | Yellow-tan pigment |
| | | | Melanin negative |
| Gelatin | | | |
| Plain | Colorless vegetative growth to trace white aerial growth | — | Dark tan pigment 1/5 |
| | | | Tan pigment 4/5 |
| | | | Liquefaction complete |

Table 3-continued

| Medium | Cultural and Biochemical Characteristics of *Streptomyces ficellus* | | |
|---|---|---|---|
| | Surface | Reverse | Other Characteristics |
| Nutrient Broth | on surface ring Colorless vegetative growth to trace white aerial growth on surface ring | — | Dark tan pigment 1/5 Tan pigment 4/5 Liquefaction complete |
| Synthetic nitrate | Trace to good vegetative surface growth | — | Pale yellow to good yellow pigment Growth throughout Compact growth at base Nitrate not reduced to nitrite |
| Nutrient nitrate | White aerial growth on surface pellicle | — | No pigment Flocculent bottom growth Nitrate not reduced to nitrite |
| Litmus milk | Vegetative growth on surface pellicle or ring | — | Litmus reduced Peptonization pH 8.4 |

Table 4

| | Comparison of *Streptomyces ficellus* and *Streptomyces virginiae* | |
|---|---|---|
| Test Condition | *Streptomyces ficellus* | *Streptomyces virginiae* Strain NA 255-B8, UC 2002 |
| | Similarities | |
| ISP-agars 2–5 | Reference Color Red or Gray | Reference Color Red |
| Peptone-iron agar | Melanin positive | Melanin positive |
| ISP-agars 2–5 | Spore chains long, straight to open spiral to spiral Spores long, smooth with surface pattern | Spore chains long, straight to open spiral to spiral Spores long, smooth with surface pattern |
| Calcium malate agar | Malate solubilized | Malate solubilized |
| Tyrosine agar | Tyrosine solubilized | Tyrosine solubilized |
| Nitrate Broth | Nitrate not reduced to nitrite | Nitrate not reduced to nitrite |
| | Differences | |
| Xanthine agar | Xanthine slightly solubilized | Xanthine not solubilized |
| Skim milk agar | Casein slightly solubilized | Casein not solubilized |
| Gelatin | Gelatin liquefaction complete | Gelatin liquefaction partial |
| Litmus milk | Litmus reduced Peptonization pH 8.4 | Litmus not reduced No peptonization pH 7.7 |
| Agars – Bennett's Czapek's sucrose Maltose tryptone Hickey Tresner | Growth at 45 C. | No growth at 45 C. |
| Growth on carbon compounds in synthetic medium | | |
| L-arabinose | Poor | Moderate |
| Rhamnose | Poor | Moderate |
| D-fructose | Poor | Moderate |
| Sucrose | Poor | Moderate |
| Lactose | Poor | Moderate |
| Raffinose | Poor | Moderate |
| Inulin | Poor | Moderate |
| Dulcitol | Poor | Moderate |
| D-mannitol | Poor | Moderate |
| D-sorbitol | Poor | Moderate |
| Salicin | Poor | Moderate |
| Na tartrate | Poor | Moderate |
| Inositol | Very good | Poor |
| D-xylose | Very good | Moderate |
| Antibiotics Produced | U-47,929 | Actithiazic acid Unidentified antifungal |

The new compound of the invention is produced when the elaborating organism is grown in an aqueous nutrient medium under submerged aerobic conditions. It is to be understood, also, that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include cornsteep liquor, yeast, autolyzed brewer's yeast with milk solids, soybean meal, cottonseed meal, cornmeal, milk solids, pancreatic digest of casein, fish meal, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as components of the medium prior to sterilization of the medium.

Production of the compound of the invention can be effected at any temperature conducive to satisfactory growth of the microorganism, for example, between about 18° and 40°C., and preferably between about 20° and 28°C. Ordinarily, optimum production of the compound is obtained in about 3 to 15 days. The medium normally remains neutral during the fermentation. The final pH is dependent, in part, on the buffers present, if any and in part on the initial pH of the culture medium.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil, liquid $N_2$ agar plug, or a slant culture. When a young, active vegetative inoculum has thus been secured, it is transferred aseptically to large vessels or tanks. The medium in which the vegetative inoculum is produced can be the same as, or different from, that utilized for the production of the new compound, so long as a good growth of the microorganism is obtained.

A variety of procedures can be employed in the isolation and purification of the compound of the subject invention, for example, solvent extraction, partition chromatography, silica gel chromatography, liquid-liquid distribution in a Craig apparatus, adsorption on resins, and crystallization from solvents.

In a preferred recovery process the compound of the subject invention is recovered from the culture medium by separation of the mycelia and undissolved solids by conventional means, such as by filtration or centrifugation. The antibiotic is recovered from the filtered or centrifuged broth by passing the broth over an adsorbent, advantageously, highly selective magnesia-silica gel adsorbent, for example, florisil which is sold by The Floridin Company, Pittsburg, Pennsylvania. The adsorbent is eluted with a suitable solvent, for example, a lower alkanone, advantageously, acetone. Fractions containing the antibiotic, as determined by thin layer chromatography (*tlc*) and antibacterial assays, as hereinafter described, are concentrated and freeze-dried to give a crude preparation of antibiotic U-47,929. Such crude preparations of antibiotic U-47,929 can be used where purity of the antibiotic preparation is not critical, for example, as a feed supplement.

The antibiotic of the subject invention also can be recovered from fermentation broth by filtration followed by adsorption on alumina (neutral or acid washed) and elution with water-acetone mixtures. Further, U-47,929 can be recovered from fermentation broth by resin sorption on a resin comprising a non-ionic macro porous copolymer of styrene crosslinked with divinylbenzene. Suitable resins are Amberlite XAD-2 and XAD-4, according to the procedure disclosed in U.S. Pat. No. 3,515,717. (Amberlite resins are available from Rohm and Haas, Philadelphia, Pa.). The antibiotic can be eluted from said resin by a water-lower alcohol (preferably methanol) mixture or a water-acetone mixture.

Essentially pure antibiotic U-47,929 can be obtained from crude preparations, obtained as disclosed above, by chromatographic procedures. In a preferred process, crude preparations of antibiotic U-47,929 are first subjected to chromatographic procedures using a non-ionic macro porous copolymer of styrene crosslinked with divinylbenzene resin, for example, Amberlite XAD-4. The column is washed with water followed by elution with a mixture of a lower alcohol-water (20:80v/v) (methanol-water is preferred). Fractions are analyzed by tlc and bioassay. Bioactive fractions are concentrated and freeze-dried. These fractions are then subjected to further chromatographic procedures on a column using a strong base anion exchange resin, for example, Dowex-1 (X-4). Other resins which can be used are Dowex-11 and Dowex-21K. The crosslinkage of the resin can vary from 4 to 8 percent. The resins are available from the Dow Chemical Company, Midland, Mich.

The above column is eluted with water and fractions are tested for bioactivity against *S. aureus* and *Penicillium oxalicum*. Fractions are also analyzed by tlc on silica gel using 95 percent aqueous ethanol-water (75:25 v/v) as the solvent. Antibiotic U-47,929 is located by spraying the silica gel plates with a ninhydrin solution. Active fractions are combined and freeze-dried to give essentially pure preparations of U-47,929.

Since antibiotic U-47,929 is a strongly basic compound, procedures involving adsorption on cationic ion exchange resin and elution by organic bases or ammonia can be used to purify crude preparations of antibiotic U-47,929. Also, crude preparations of antibiotic U-47,929 can be purified by transformation to a salt form by treatment with inorganic or organic acids. The base form of the antibiotic can be recovered by neutralization of the acid anion with ammonia or other inorganic or organic bases.

In order to make salts of antibiotic U-47,929 with both inorganic or organic acids, as hereinafter disclosed in exemplary form, it is necessary that the acid be carefully added to an aqueous solution of antibiotic U-47,929 in view of the unstability of this antibiotic at acid pH's. Examples of inorganic and organic acids which can be used, but which examples should not be considered limiting, are hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicyclic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

Antibiotic U-47,929 and its salts are active against *S. aureus* and can be used to disinfect washed and stacked food utensils contaminated with this bacteria; they can also be used as disinfectants on various dental and medical equipment contaminated with *S. aureus*. Further, antibiotic U-47,929 and its salts can be used to treat laboratory mice infected with *S. aureus*.

It is to be understood that the microbiological process disclosed herein, though described in detail with reference to *Streptomyces ficellus* Dietz, sp. n., NRRL 8067, is not limited to this particular microorganism deposit. It is intended that any microorganism meeting the cultural characteristics disclosed herein, or substantial equivalence thereof, wherever deposited in the world, is a part of the subject microbiological process. Further, it is intended that this invention include strains or mutants of the said microorganism which can be produced by procedures well known in the art, for example, by subjecting the novel microorganism to x-ray or ultraviolet radiation, nitrogen mustard, phage exposure, and the like.

The following examples are illustrative of the process and products of the subject invention but are not to be construed as limiting. All percentages are by weight and all solvent mixture proportions are by volume unless otherwise noted.

EXAMPLE 1

Part A. Fermentation

A soil stock of Streptomyces ficellus Dietz, sp. n., NRRL 8067, is used to inoculate a series of 500-ml. Erlenmyer flasks, each containing 100 ml. of sterile preseed medium consisting of the following ingredients:

| | |
|---|---|
| Glucose monohydrate | 25 Gm/l |
| Pharmamedia* | 25 Gm/l |
| Tap water q.s. | 1 liter |

*Pharmamedia is an industrial grade of cottonseed flour produced by Traders Oil Mill Company, Fort Worth, Texas.

The preseed medium presterilization pH is 7.2. The preseed inoculum is grown for three days at 28°C. on a Gump rotary shaker operating at 250 r.p.m. and having a 2½ inch stroke.

Preseed inoculum (300 ml.), prepared as described above, is used to inoculate a seed tank containing 20 liters of sterile seed medium consisting of the following ingredients:

| | |
|---|---|
| Glucose monohydrate | 10 Gm/l |
| Corn steep liquor | 10 Gm/l |
| Pharmamedia | 2 Gm/l |
| Wilson's Peptone Liquor No. 159* | 10 Gm/l |
| Tap water | Balance |

*Wilson's Peptone Liquor No. 159 is a preparation of hydrolyzed proteins of animal origin.

The inoculated seed mediums is incubated at a temperature of 28°C. for 2 days while being agitated at a rate of 400 r.p.m. and aerated at a rate of 10 standard liters per minute with a back pressure of 10 psig.

After 2 days incubation, the seed medium is used to inoculate (the inoculation rate is 5 liters of seed inoculum per 100 liters of fermentation medium) a 250 liter tank fermentation containing sterile fermentation medium consisting of the following ingredients:

| | |
|---|---|
| Glucose monohydrate | 15 Gm/l |
| Black Strap Molasses | 20 Gm/l |
| Starch | 40 Gm/l |
| Pharmamedia | 25 Gm/l |
| CaCO$_3$ | 8 Gm/l |
| Tap water q.s. | Balance |
| pH — 7.2 (presterilization) | |

The fermentation tank is incubated at a temperature of 28 C., with agitation of 240 r.p.m. and aeration at 80 standard liters per minute with back pressure at 10 psig. Ucon antifoam agent (a synthetic defoamer supplied by Union Carbide, N.Y., N.Y.) is used if needed. Harvest is usually after 3 to 12 days of fermentation. A typical 3-day fermentation has the following titers of antibiotic in the fermentation broth:

| Day | Assay, BU/ml. |
|---|---|
| 1 | trace |
| 2 | 18 |
| 3 | 14 |

The assay is an agar disc plate assay using the microorganism S. aureus. The agar medium is buffered with 0.1 M phosphate buffer at a pH of 7.4. A unit volume (0.08 ml.) of solution containing the substance to be assayed is placed on a 12.7 mm. paper disc which is then placed on an agar plate seeded with the assay organism. The agar plate is then incubated for 16–18 hours at 37°C. A biounit (BU) is defined as the concentration of the antibiotic which gives a 20 mm. zone of inhibition under the above assay conditions. Thus, if for example a fermentation beer, or other solution containing the antibiotic, needs to be diluted 1/100 to give a 20 mm. zone of inhibition, the potency of such beer or solution is 100 BU per ml.

Part B. Recovery

Antibiotic U-47,929 in beers is detected and assayed by the use of tlc and antibacterial assays. Thin layer chromatograms are run on silica gel plates using 95% aqueous ethanol-water (75:25 v/v) as the solvent system. Bioactivity is detected by bioautography using S. aureus-seeded agar trays as disclosed in Example 1, Part A.

Whole fermentation beer (ca. 5000 liters), obtained as described above, is filtered with the aid of diatomaceous earth as a filter aid. The filter cake is washed with water and the cake is then discarded. Part of the fermentation beer and wash (2000 liters) is passed at a rate of 5 liters/min. over a florisil column prepared from ca. 80 kg. of acid-washed florisil. The spent beer is discarded. The column is then washed with 150 liters of water at a rate of 5 liters/min. The aqueous wash is concentrated in vacuo to a volume of ca. 40 liters, and this concentrate is freeze-dried to give 1467 grams of a crude preparation A containing traces of antibiotic U-47,929.

The florisil column is then eluted with 900 liters of 50% aqueous acetone. The following fractions are obtained:

Fraction I — 60 liters
Fraction II — 225 liters
Fraction III — 225 liters
Fraction IV — 420 liters Fraction I is not used for isolation of antibiotic U-47,929.

Fraction II is concentrated to a volume of ca. 40 liters and the concentrate is freeze-dried to give 240 grams of a preparation of antibiotic U-47,929 which is designated Preparation B.

Fraction III is concentrated and the concentrate is freeze-dried to give 105 grams of a preparation of antibiotic U-47,929 which is designated Preparation C.

Fraction IV, like Fractions II and III, is concentrated and the concentrate is freeze-dried to give a preparation containing small amounts of antibiotic U-47,929.

Following the procedures described above, 1900 liters of additional clear beer obtained from a fermentation as described in Part A, is passed over a florisil column which is then washed with water and eluted with 50% aqueous acetone to give Preparations D (374 grams) and E (225 grams) of antibiotic U-47,929.

Preparations B, C, D, and E, obtained as described above, are combined and then subjected to further purification procedures as disclosed in Part C.

Part C. Purification (No. 1) Chromatography on Amberlite XAD-4

The starting material is Preparation B (240 grams), Preparation C (105 grams), Preparation D (374 grams), and Preparation E (225 grams), obtained as described above in Part B. These preparations are combined and dissolved in 94.4 liters of 10% aqueous sodium chloride solution. This solution is adjusted to pH 10.0 and passed over a 23 cm. (internal diameter) column containing 27 liters of Amberlite XAD-4, at a rate of 100 ml/min. The spent beer is collected in 3 fractions (50 liters, 25 liters and 20 liters respectively). All 3 fractions are found bioinactive on the *S. aureus* assay, as described above, and are discarded.

The column is then washed with 72 liters of water. Eighteen 4-liter fractions are collected and designated Fractions 1-18.

The column is then eluted with a mixture of methanol-water (20:80 v/v). Seventeen 4-liter fractions are collected and designated Fractions 19-35.

The above fractions are analyzed by tlc and bioassay.

The following pools are made. Each pool is concentrated to a small volume and freeze-dried to give the preparations noted.

Pool I — Fractions 1-3, preparation designated 127.1, 400 grams.

Pool II — Fractions 4-8, preparation designated 127.2, 258 grams.

Pool III — Fractions 9-23, preparation designated 127.3, 187.6 grams.

Pool IV — Fractions 24-28, preparation designated 127.4, 158.6 grams.

Preparations 127.3 and 127.4 are shown by tlc to contain antibiotic U-47,929 only.

(No. 2) Chromatography on Dowex-1

The column is prepared from 300 ml. of Dowex-1 (X-4) in the hydroxide anion form.

A portion of Preparation 127.3 (20.0 grams), obtained as described above, is dissolved in 200 ml. of water (pH found 10.4). This solution is passed through the Dowex-1 (X-4) column at a rate of 5 ml/min. The column is eluted with water. Fractions of 20 ml. are collected. Selected fractions are tested for bioactivity against the microorganisms *S. aureus* and *P. oxalicum*. Bioactivity against *S. aureus* and *P. oxalicum* was determined as follows:

Filter paper discs (12.7 mm diameter) are dipped into the column eluates (1 disc/fraction) and the discs are then placed on agar plates seeded with *S. aureus* or *P. oxalicum*. The plates are incubated for 16-18 hours at 37°C. for *S. aureus* and 28°C. for *P. oxalicum*. The resulting zones of inhibition (measured in millimeter diameter) are used as a rough indication of bioactivity of the fractions.

The results of the bioactivity of the fractions are as follows:

| Fraction Number | Zone (mm) | |
|---|---|---|
| | S. aureus | P. oxalicum |
| 2 | 0 | 0 |
| 4 | 0 | 0 |
| 6 | 0 | 0 |
| 8 | 0 | 17 |
| 10 | 0 | 15 |
| 12 | 21 | 15 light zones |
| 14 | 26 | 27 |
| 16 | 27 | 26 |
| 18 | 24 | 19 |
| 20 | 25 | 20 |
| 22 | 25 | 22 |
| 24 | 25 | 23 |
| 26 | 29 | 31 |
| 28 | 31 | 34 |
| 30 | 31 | 35 |
| 32 | 30 | 35 |
| 34 | 28 | 35 |
| 36 | 28 | 35 |
| 38 | 29 | 34 |
| 40 | 28 | 34 |
| 42 | 28 | 34 |
| 44 | 27 | 33 |
| 46 | 27 | 32 |
| 48 | 28 | 29 |
| 50 | 30 | 33 |
| 55 | 30 | 31 |
| 60 | 29 | 30 |
| 65 | 28 | 26 |
| 70 | 28 | 23 |
| 75 | 28 | 22 |
| 80 | 25 | 20 |
| 85 | 25 | 17 light zones |
| 90 | 23 | 16 |
| 95 | 22 | tr |
| 100 | 22 | tr |
| 120 | 24 | 0 |
| 130 | 24 | 0 |
| 140 | 24 | 0 |
| 150 | 23 | 0 |

Fractions are also analyzed by tlc on silica gel using 95% aqueous ethanol-water (75:25 v/v) as the solvent. Antibiotic U-47,929 is located on the column by spraying with ninhydrin solution. The presence of antibiotic U-47,929 is indicated by the appearance on the plate as a purple spot.

Fractions 26-50 are combined and freeze-dried to give 8.3 grams of an essentially pure preparation of antibiotic U-47,929.

Fractions 51-75 are also combined and freeze-dried to give 1.6 grams of an essentially pure preparation of antibiotic U-47,929. Tlc shows that both preparations contain antibiotic U-47,929 only.

We claim:

1. Antibiotic U-47,929, which is active against *S. aureus* and which in its essentially pure form:
   a. has the molecular formula $C_{13}H_{24}N_6O_3$;
   b. has the following elemental analysis: C, 50.00; H, 7.69; N, 26.92; O, 15.38;
   c. has a specific rotation of $[\alpha]_D^{25} = +39°$ (c, 1, water);
   d. is soluble in water and lower alcohols, for example, methanol and ethanol; is relatively insoluble in ketones, halogenated or saturated hydrocarbon solvents, ethyl acetate, or other ester-type solvents;
   e. has a characteristic infrared adsorption spectrum when dissolved in a mineral oil mull as shown in FIG. 1 of the drawings;
   f. has a characteristic NMR spectrum as shown in FIG. 2 of the drawings, or acid addition salts thereof.

2. A process for preparing antibiotic U-47,929, which comprises cultivating *Streptomyces ficellus* Dietz, sp. n., having the identifying characteristics of NRRL 8067, and mutants thereof, in an aqueous nutrient medium under aerobic conditions until substantial antibiotic activity is imparted to said medium.

3. A process, according to claim 2, wherein said aqueous nutrient medium contains a source of assimilable carbohydrate and assimilable nitrogen.

4. A process for recovering antibiotic U-47,929 from an antibiotic U-47,929 fermentation beer which comprises:
   1. filtering an antibiotic U-47,929 containing fermentation beer to obtain a clear beer;
   2. passing said clear beer over an adsorbent to obtain crude preparations of antibiotic U-47,929; and,
   3. chromatographing said crude preparations of antibiotic U-47,929 on (a) a non-ionic macroporous copolymer of styrene crosslinked with divinylbenzene resin, and then on a (b) strong base anion exchange resin to obtain an essentially pure preparation of antibiotic U-47,929.

5. A process, according to claim 4, wherein the adsorbent is a highly selective magnesia-silica gel adsorbent.

6. A process, according to claim 5, wherein the adsorbent is florisil.

7. A process, according to claim 4, wherein the non-ionic macro-porous copolymer of styrene crosslinked with divinylbenzene resin is Amberlite XAD-4.

8. A process, according to claim 4, wherein said strong base anion exchange resin is Dowex-1 (X-4).

* * * * *